(12) United States Patent
Balb et al.

(10) Patent No.: US 6,990,159 B1
(45) Date of Patent: Jan. 24, 2006

(54) CIRCUIT FOR GENERATING CLOCK PULSES IN A COMMUNICATIONS SYSTEM

(75) Inventors: Markus Balb, Munich (DE); Ralf Schedel, Stamberg (DE); Walter Fiessinger, Taufkirchen (DE)

(73) Assignee: Infineon Technologies AG, München (DE)

(*) Notice: Subject to any disclaimer, the term of this patent is extended or adjusted under 35 U.S.C. 154(b) by 222 days.

(21) Appl. No.: 10/019,885

(22) PCT Filed: May 29, 2000

(86) PCT No.: PCT/DE00/01735

§ 371 (c)(1),
(2), (4) Date: May 13, 2002

(87) PCT Pub. No.: WO01/03342

PCT Pub. Date: Jan. 11, 2001

(30) Foreign Application Priority Data

Jun. 30, 1999 (DE) ............................... 199 30 191

(51) Int. Cl.
*H04L 7/00* (2006.01)

(52) U.S. Cl. .................. 375/354; 375/376; 327/141; 370/503

(58) Field of Classification Search ................ 375/257, 375/260, 259, 294, 354, 356, 371, 375, 376, 375/355; 327/141, 147, 291, 144; 370/503
See application file for complete search history.

(56) References Cited

U.S. PATENT DOCUMENTS

| | | | | |
|---|---|---|---|---|
| 6,127,858 A | * | 10/2000 | Stinson et al. | ................ 327/99 |
| 6,433,645 B1 | * | 8/2002 | Mann et al. | ................ 331/18 |
| 6,687,320 B1 | * | 2/2004 | Chiu et al. | ................ 375/376 |

* cited by examiner

*Primary Examiner*—Jean B. Corrielus
(74) *Attorney, Agent, or Firm*—Maginot Moore & Beck

(57) ABSTRACT

A circuit arrangement for a communication system for terminating a plurality of interfaces at a common bus and for generating a synchronization clock for synchronizing the bus is provided. In one aspect, a circuit arrangement for a communication system includes a first multiplexer controlled by a first control signal with a plurality of inputs corresponding to a plurality of transmission lines of the interfaces, a respective phase control unit, preceding each input of the first multiplexer, which derives a respective clock generator signal from a received signal of the corresponding transmission line, where the clock generator signal of one of the transmission lines is switched through as output signal of the first multiplexer in dependence on the first control signal, and a phase locked loop, at the inputs of which the output signal of the first multiplexer and a clock from a clock generator operated with an external crystal oscillator.

7 Claims, 6 Drawing Sheets

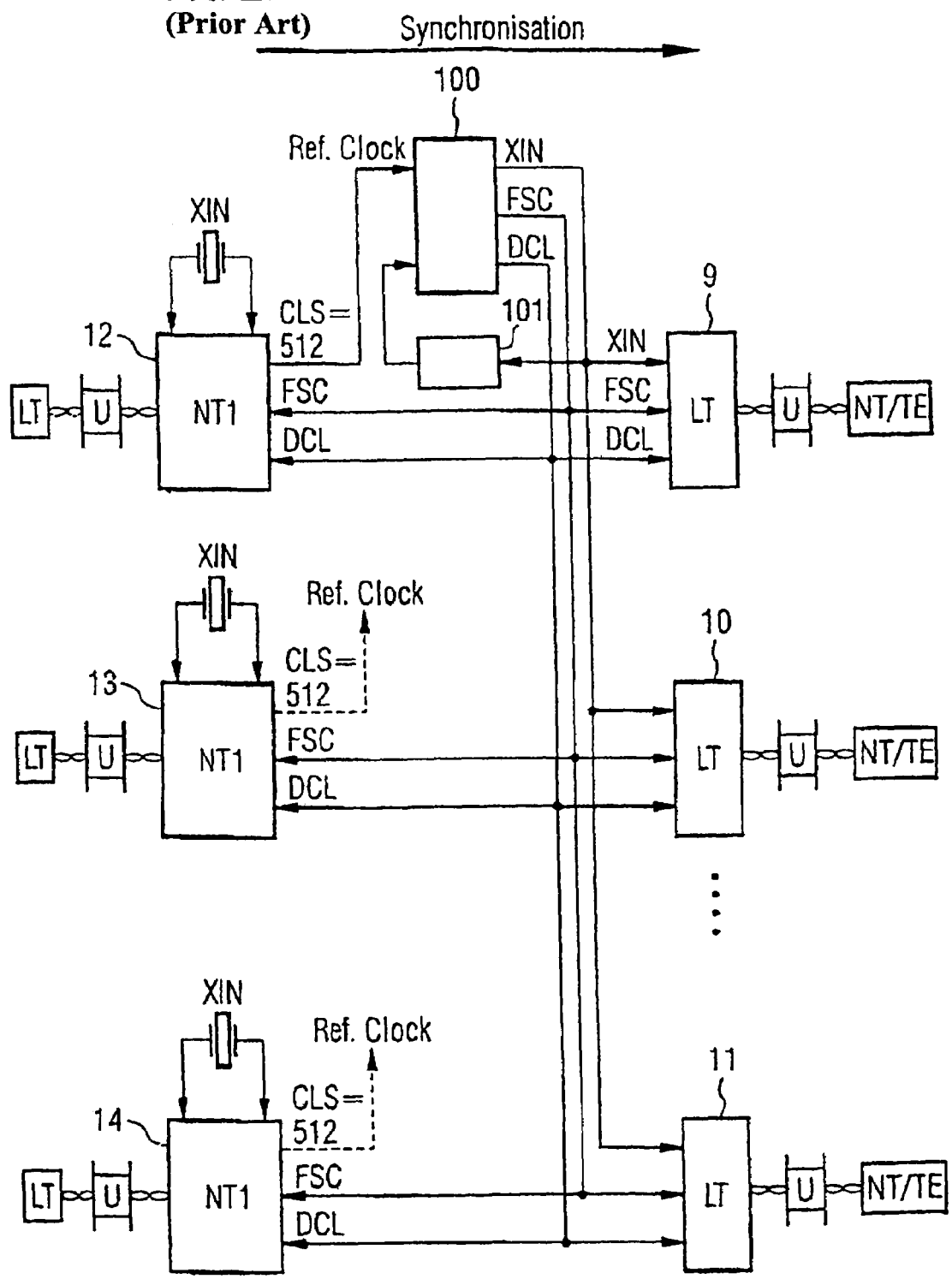

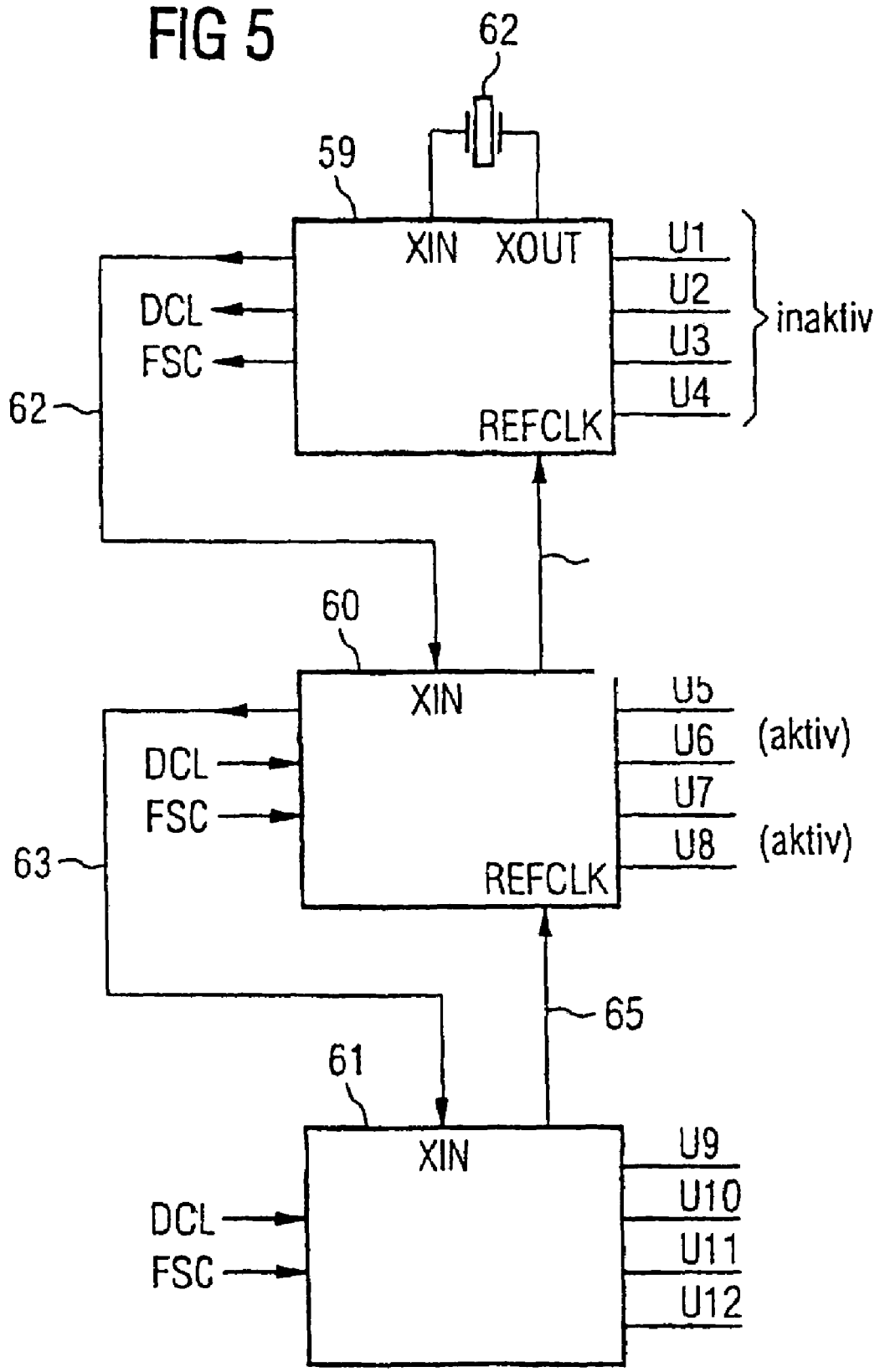

CIRCUIT FOR GENERATING CLOCK PULSES IN A COMMUNICATIONS SYSTEM

CROSS-REFERENCE TO RELATED APPLICATION

The following application claims priority to Application No. PCT/DE00/01735, filed on May 29, 2000.

BACKGROUND

1. Field of the Invention

The invention relates, generally, to a circuit arrangement for generating clock pulses in a communications system, more particularly, to a circuit arrangement for a communication system for terminating a plurality of interfaces at a common bus and for generating a synchronization clock for synchronizing the bus.

2. Discussion of Related Art

In ISDN (Integrated Services Digital Network), the connection at the subscriber end, the so-called ISDN basic access, have a number of reference points R, S, T, U which correspond to interfaces.

FIG. 1 shows a model of the ISDN basic access with a connection to an exchange. The U interface forms the line termination both at the subscriber end and at the exchange end.

The exchange have a local line termination 2 (LT) and a digital ISDN exchange termination 1 (ET) which communicate with one another via the V interface.

The ISDN basic access have a network termination 3 (NT) at the subscriber end. The network termination 3 is composed of a first network termination 7 (NT-1), which transfers user information and signaling information to the exchange (physical network termination according to level 1 of the ISO/OSI reference model), and a second network termination 8 (NT-2) which handles concentrating and switching tasks (logical network termination according to level 2 and 3 of the ISO/OSI reference model). The first and second network terminations 7, 8 are connected via the T interface.

A digital ISDN-compatible subscriber terminal 4 (TE1) can be connected directly to the second network termination 8 via the S interface.

To connect an analog subscriber terminal 6 (TE2), a terminal adapter 5 (TA) is necessary which is connected to the second network termination 8. The analog subscriber terminal 6 can then be connected to the terminal adapter 5 via the R interface.

In the ISDN basic access, hierarchical clock synchronization is used: a device configured as master, for example a device executing the top levels of the ISO/OSI reference model, synchronizes a device configured as slave, for example a device executing the lower levels of the ISO/OSI reference model.

In FIG. 1, the exchange 2 is configured as master of the network termination 3 and synchronizes it.

In the case of a multiplicity of slaves which are synchronized by a master, one of these slaves is appointed as reference clock generator for the remaining slaves. In the case of a failure of the reference clock generator, a further slave is appointed as reference clock generator and so forth.

FIG. 2a shows an arrangement in which, at the subscriber end in an ISDN basic access, a number of first network terminations 12 to 14 are connected to a telecommunication system 15 via a common network termination system bus 18. The telecommunication system 15 have the further elements of the ISDN basic access of the subscriber end. A number of subscriber terminals 16 to 17 can be connected to the telecommunication system 15. The first network terminations 12 to 14 are in each case connected to local exchange terminations 9 to 11 via a U interface.

For the hierarchical clock synchronization, the first network terminations 12 to 14 execute tasks of the same level of the ISO/OSI reference model so that one of the first network terminations 12 to 14 or, respectively, one of the corresponding U interfaces must be selected as first reference clock generator for the remaining first network terminations or, respectively, U interfaces. Furthermore, further reference clock generators must be determined which take over the task of the first reference clock generator in the event of its failure. The network termination system bus 18 must be synchronized to the respective reference clock generator.

FIG. 2b shows in detail the clock generation and distribution of various clocks in the arrangement pictured in FIG. 2a. The clocks necessary for operating the arrangement are generated via a phase locked loop 100 and a clock divider 101. To illustrate the direction of synchronization, a line termination 16 (LT) of the network operator, which is responsible for the synchronization, is shown diagrammatically on the right-hand side in FIG. 2b. Furthermore, a network termination with subscriber terminal NT/TE 17 is shown by way of example on the left-hand side.

Each of the first network terminations 12 to 14 have its own 15.36 MHz crystal by means of which, for example, a 512 kHz clock CLS is generated as reference clock. The clock CLS is supplied to the phase locked loop 100 which, in turn, generates from the 512 kHz clock a 15.36 MHz clock XIN, an 8 kHz frame clock FSC and a bit clock DCL which has a frequency of between 512 and 4096 kHz. The frame clock FSC and the bit clock DCL are supplied to each of the first network terminations 12 to 14 and each of the local exchange terminations 9 to 11 via in each case one line. The clock XIN is fed back to the phase locked loop 100 via the clock divider 101 and supplied in parallel to the local exchange terminations 9 to 11 via one line. In this arrangement, the reference clock generator is the 512 kHz clock CLS which is generated in each of the first network terminations 12 to 14.

FIG. 3 shows an arrangement in which a line termination 20 which is not ISDN capable provides subscribers with access to the public ISDN network by means of a digital loop carrier (DLC) system.

For this purpose, a number of first subscriber accesses 35 are combined in a first so-called "D-channel bank" 22 in a digital ISDN exchange termination 19. The basic channels of each basic access are transmitted concentrated to the line termination 20 via a first broadband transmission channel 23.

In the line termination 20, the basic channels of a second "D-channel bank" 24 are distributed to the corresponding subscriber accesses 25 to 32 which are also called line cards in technical language. A number of accesses 25 to 28 are then combined in a third "D-channel bank" 21 to form so-called "central office terminals" and are transmitted via a second broadband transmission channel 33 to a subscriber having a number of network terminations 36 to 37.

The individual accesses 25 to 28 are there distributed to the corresponding network terminations via a fourth "D-channel bank" 34 which forms the so-called remote digital terminal (RDT).

The arrangements shown in FIGS. 2 to 3 can also be used for so-called xDSL (x Digital Subscriber Line) systems such as ADSL, SDSL, VDSL or HDSL. It is only necessary to replace the ISDN transmission method at the U interfaces by the corresponding xDSL transmission method. The basic arrangement shown in FIGS. 2 to 3 will not change.

In the arrangement shown in FIG. 3, similarly to the arrangement shown in FIG. 2, a reference clock generator must be selected and other reference clock generators used as replacement in the event of a failure of the first reference clock generator must be determined for the hierarchical clock synchronization.

SUMMARY OF THE INVENTION

The invention is, therefore, based on the object of creating a circuit arrangement for generating clock pulses in a communication system which, in particular, is based on ISDN or xDSL, in which the disadvantages described initially are avoided and, in particular, the circuit arrangement can be connected directly to a telecommunication system or a concentrator via a common network termination system bus.

This object is achieved by a circuit arrangement having at least one network termination, where each network termination can be connected to at least one transmission line in each case and to a bus and where a clock is provided for synchronizing the bus characterized in that a multiplicity of clock generators for generating the clock and means for selecting a clock generator are provided.

The circuit arrangement for generating clock pulses in a communication system according to the invention have at least one network termination, where each network termination can be connected to at least one transmission line in each case and to a bus and where a clock is provided for synchronizing the bus. A multiplicity of clock generators for generating the clock and means for selecting a clock generator are provided in the circuit arrangement. The circuit arrangement can be advantageously connected to a telecommunication system via the bus without any additional circuit expenditure.

The means for selecting a clock generator are preferably programmable. Furthermore, the means for selecting a clock generator can be programmable via a register. Due to the programming, the circuit arrangement can be adapted to various requirements and, in particular, in the event of a failure of one of the clock generators, is still operational by means of simple reprogramming.

The means for selecting a clock generator preferably has a first multiplexer, to whose inputs transmission lines can be connected, particularly via so-called phase control units, and a signal from which a clock is derived is received via one of the transmission lines. In other words, the received signals of the connected transmission lines are used as clock generator, as it were, and the phase control units extract the clock information from the signal received in each case. In particular, the means for selecting a clock generator has a second multiplexer, at the inputs of which the output signal of a phase locked loop and a reference clock are present. The phase locked loop is preferably supplied with a further clock from a crystal oscillator circuit and the output signal of the first multiplexer as input signals.

In a preferred embodiment, the following three clock generators can be used as reference clock generators: a signal received via one of the transmission lines is used as first clock generator, the reference clock itself is used as second clock generator if all transmission lines are in active, and the combination of received signals from at least two transmission lines is used as third clock generator, the clock generated by the third clock generator being generated, in particular, by averaging the clock information determined from the signals of the transmission lines involved. The averaging for determining the clock can also be provided with weighting. The signals of all four transmission lines are preferably combined in order to derive the clock information for the reference clock.

The signals which are transmitted via the transmission lines preferably correspond to the U interface protocol of ISDN. The circuit arrangement can then be advantageously used in ISDN applications in which a number of U interfaces are administered.

On the other hand, the signals which are transmitted via the transmission lines can also correspond to an XDSL protocol. For this purpose it is only necessary to change the signal transmission method to an XDSL transmission method. In particular, the XDSL protocol can correspond to an ADSL or SDSL or VDSL or HDSL protocol.

BRIEF DESCRIPTION OF THE DRAWINGS

Preferred embodiments of the invention are found in the subsequent description in conjunction with the drawings, in which:

FIG. 2b shows the clock generation and distribution in the arrangement shown in FIG. 2a, FIG. 3 shows an arrangement in which a line termination provides subscribers with access to the public ISDN network by means of a digital loop carrier (DLC) system, FIG. 5 shows a second exemplary embodiment of a circuit arrangement according to the invention.

DETAILED DESCRIPTION OF EXEMPLARY EMBODIMENTS

Figure 1:
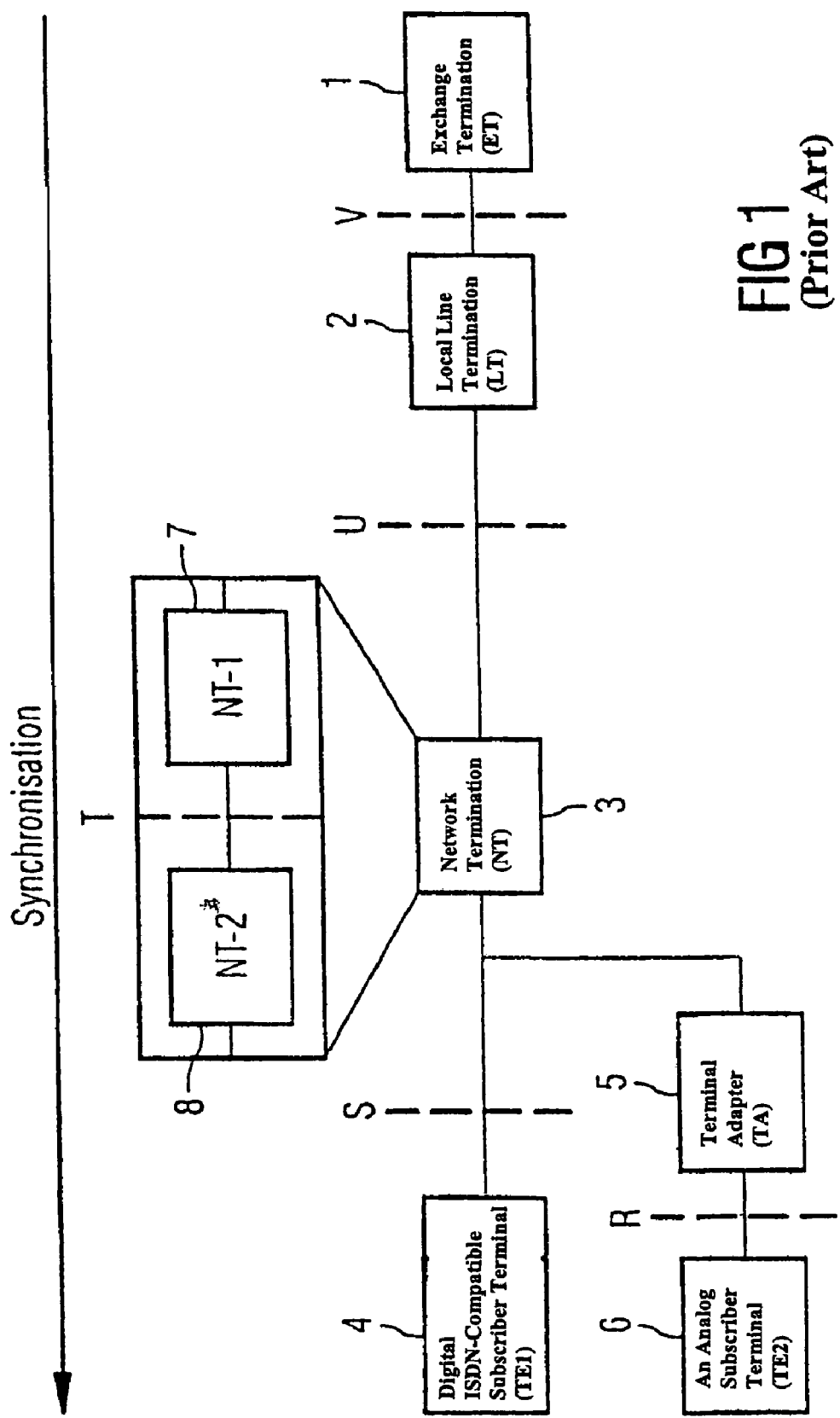
FIG. 1 shows a model of the ISDN basic access with a connection to an exchange.
Figure 2A:
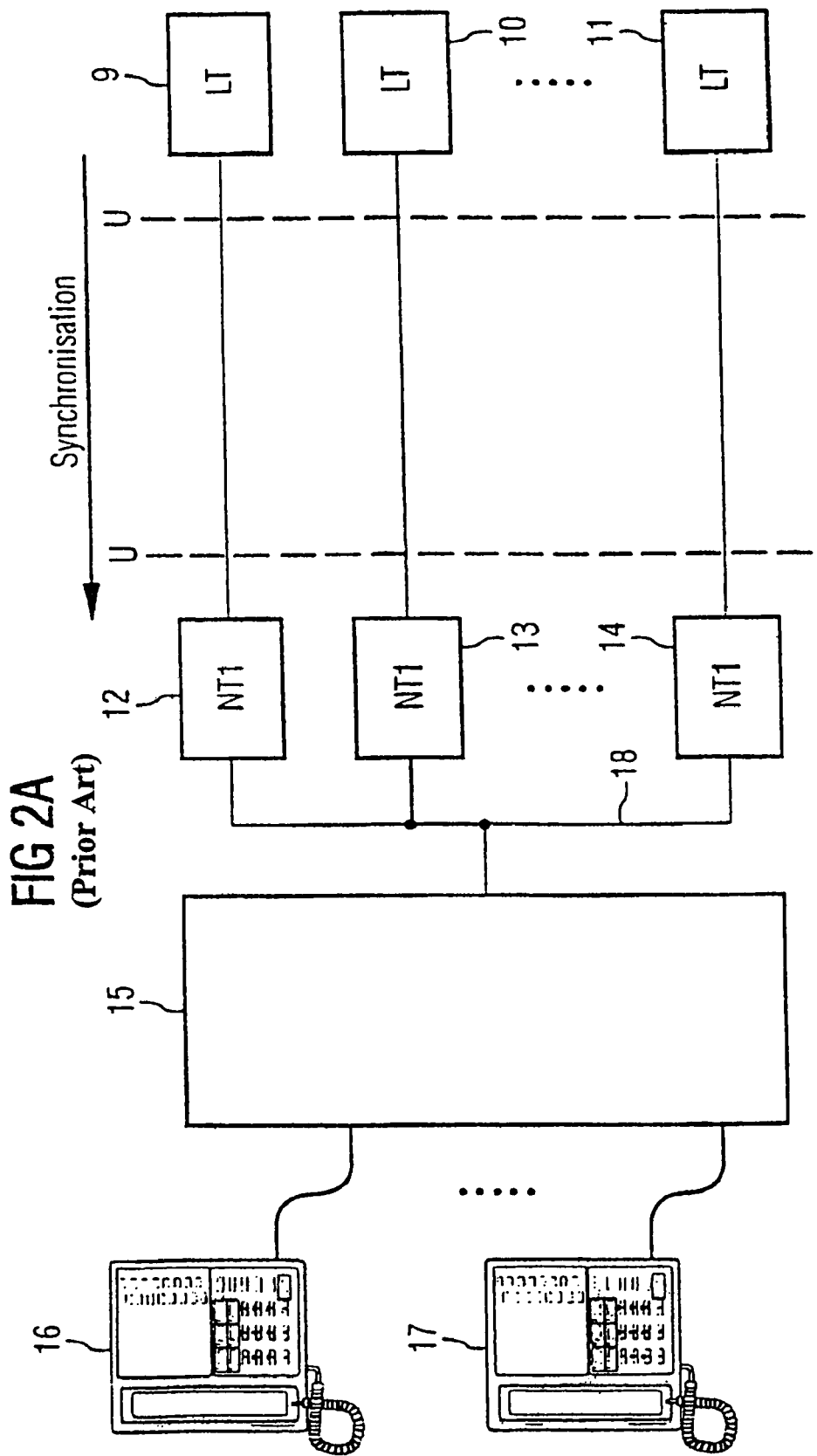
FIG. 2a shows an arrangement in which at the subscriber end in an ISDN basic access, a number of first network terminations are connected to a telecommunication system via a common network termination system bus.
Figure 3:
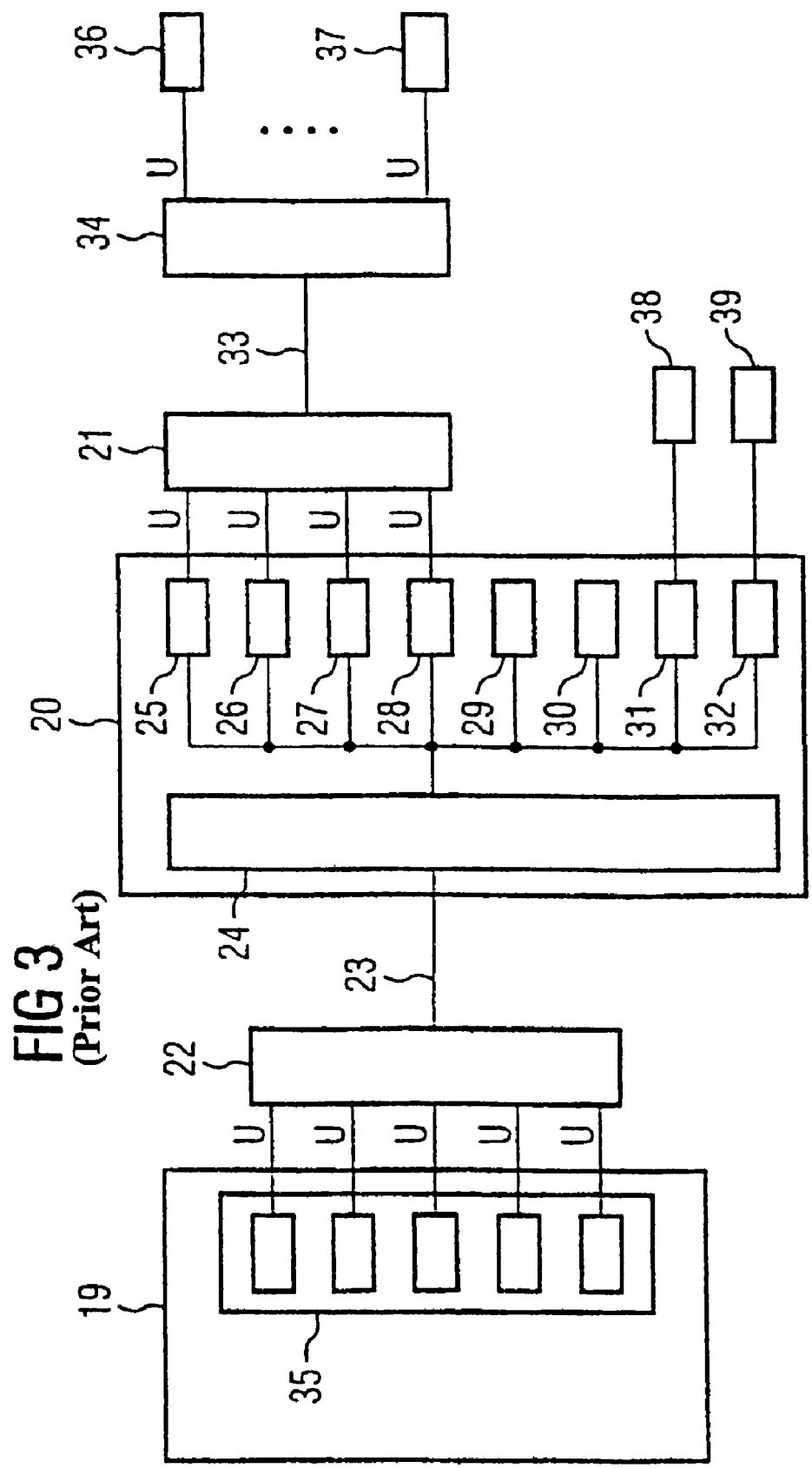

FIGS. 1 to 3 which relate to the prior art have already been discussed in the introduction to this description.

Figure 4:
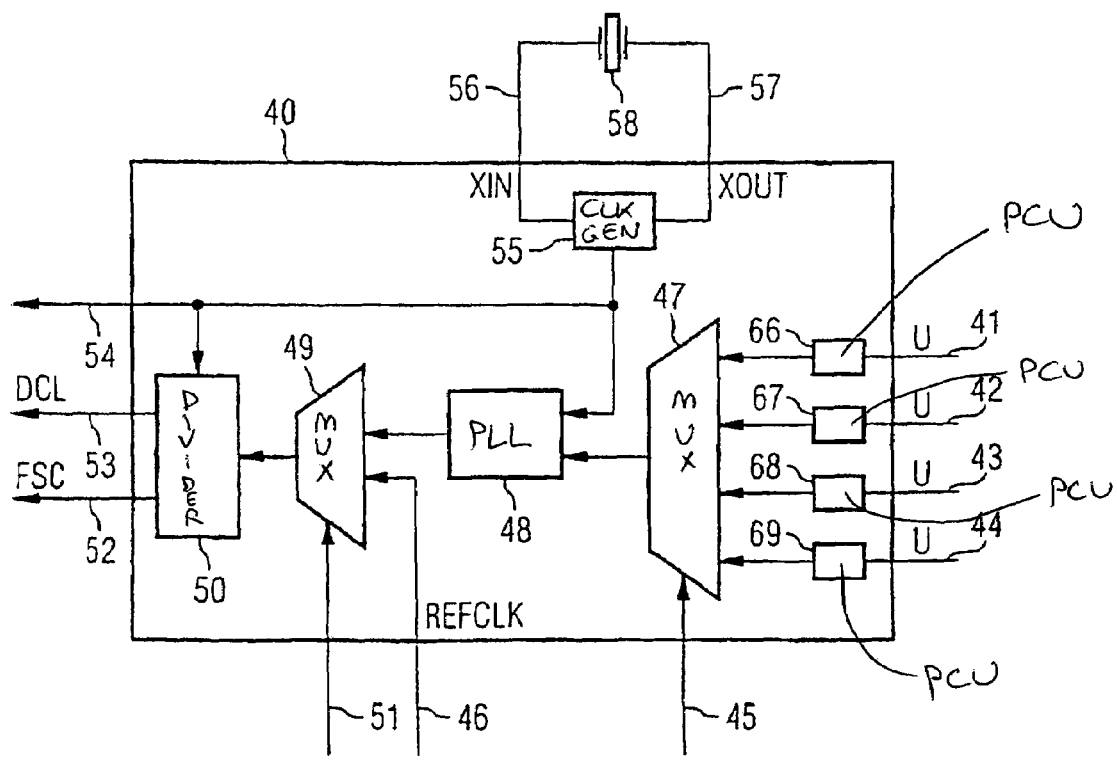
FIG. 4 shows a first exemplary embodiment of a circuit arrangement according to the invention.

FIG. 4 shows an integrated circuit 40 which have four U interfaces 41 to 44. The integrated circuit 40 is used in a communication system for connecting four U interfaces to a common network termination system bus which, in turn, can be connected to a telecommunication system.

An external reference clock 46 which is generated, for example, by another integrated circuit, can be fed into the integrated circuit 40. This external reference clock 46 is needed when none of the four U interfaces are active and accordingly no U interface is available as reference clock generator.

Each of the four U interfaces 41 to 44 can be programmed as reference clock generator. For this purpose, the integrated circuit 40 have a first multiplexer 47 which can be controlled via a first control signal 45. To extract a clock signal from the respective received signals of the U interfaces 41, 42, 43, 44, the multiplexer 47 in each case have a phase control unit (PCU) 66, 67, 68, 69 for each input. The first control signal 45 switches one of the four U interfaces 41 to 44, which are connected to the inputs of the first multiplexer 47, through to the output of the first multiplexer 47. The output signal of the multiplexer 47 is conducted to a phase locked loop 48 which receives a clock of 15.36 MHz via a clock generator 55. The 15.36 MHz clock is available as output signal 54, for example for other integrated circuits. The clock generator 55 can be connected to a 15.36 MHz crystal 58 via connections 56 and 57. From the signals received via a U interface operating as reference clock generator, the phase locked loop 48 regenerates the reference clock which is supplied to a second multiplexer 49. The second multiplexer 49 is switched by a second control signal 51. The second multiplexer switches either the reference clock regenerated from a U interface or the external reference clock 46 fed in if none of the four U interfaces are active, through to a PLL/clock divider unit 50. The PLL/clock divider unit 50 divides a first clock at its input into a second clock 52 and a third clock 53. The second clock 52 can be used for synchronizing a network termination system bus and have an 8 kHz frame clock FSC. The third clock 53 have a bit clock DCL. Furthermore, the PLL/clock divider unit 50 uses the clock generated by the clock generator 55.

The integrated circuit 40 can be programmed as master or as slave. This makes it possible to set the direction of synchronization of an arrangement in which the integrated circuit 40 is used. In master mode, the reference clock generator can be set to one of the following clock sources by programming the integrated circuit 40:

one of the four U interfaces 41 to 44 is used as reference clock generator; or the mean value over all four U interfaces 41 to 44 is formed; the mean value is then used as reference clock generator; or an external reference clock 46 is used as reference clock generator; this setting is appropriate if none of the four U interfaces 41 to 44 are active.

FIG. 5 shows these three cases of operation.

A first 59, second 60 and third 61 integrated circuit as shown in FIG. 4 are interconnected to form a chain and are used for driving a total of twelve U interfaces U1 to U12.

The first integrated circuit 59 is configured as master. For this purpose, a 15.36 MHz crystal 62 is connected to the first integrated circuit 59. By this means, a 15.36 MHz clock is generated internally which is conducted as clock signal 62 to a connection XIN of the second integrated circuit 60 provided for connecting a crystal. As a result, the second integrated circuit does not need a crystal. The U interfaces U1 to U4 connected to the first integrated circuit 59 are all inactive, i.e. no signal is transmitted or received via these interfaces. None of the U interfaces U1 to U4 can thus be used as reference clock generator.

Of the U interfaces U5 to U8 connected to the second integrated circuit 60, U6 and U8 are active, i.e. a signal is transmitted or received via these two interfaces. The second integrated circuit 60 is programmed in such a manner that U interface U8 is to be used as reference clock generator. For this purpose, the reference clock signal 64, which is generated internally in the second integrated circuit 60 via the U interface U8, is conducted as external reference clock to the first integrated circuit 59, the master. The first integrated circuit 59 is programmed for an external reference clock for this purpose.

The third integrated circuit 61 is supplied with the 15.36 MHz clock 63 at the terminal XIN provided for connecting a crystal from the second integrated circuit 60. In this integrated circuit, too, a crystal is saved. If at least one of the U interfaces U9 to U12 connected to the third integrated circuit 61 is active, i.e. a signal is received or transmitted via one of the U interfaces, the third integrated circuit is programmed as standby reference clock generator for the second integrated circuit 60. For this purpose, the reference clock 65 is conducted to the second integrated circuit 60 as external reference clock from the third integrated circuit 61. The second integrated circuit 60 and third integrated circuit 61 are configured as slaves and accordingly receive the frame clock FSC and the bit clock DCL from the first integrated circuit 59.

The second integrated circuit is programmed as reference clock generator but can be reprogrammed to the external reference clock from the third integrated circuit 61 if all connected U interfaces U5 to U8 fail. For this purpose, a circuit for monitoring the U interfaces can be provided which automatically sets the reference clock generator, i.e. reprograms the second integrated circuit in this case.

What is claimed is:

1. A circuit arrangement for a communication system for terminating a plurality of interfaces at a common bus and for generating a synchronization clock for synchronizing the bus, comprising:

a first multiplexer controlled by a first control signal with a plurality of inputs corresponding to a plurality of transmission lines of the interfaces;

a respective phase control unit, preceding each input of the first multiplexer, which derives a respective clock generator signal from a received signal of a corresponding transmission line;

where the clock generator signal of one of the transmission lines is switched through as output signal of the first multiplexer in dependence on the first control signal;

a phase locked loop, at the inputs of which the output signal of the first multiplexer and a clock from a clock generator operated with an external oscillating crystal, are present and at the output of which an internal reference clock is present which is generated from the output signal of the first multiplexer and the clock from the clock generator;

an output connection for the clock from the clock generator;

a second multiplexer, controlled by a second control signal, at the inputs of which the output signal of the phase locked loop and a reference clock, supplied externally, are present;

where one of the input signals of the second multiplexer is switched through as output signal of the second multiplexer in dependence on the second control signal; and a clock divider unit, following the second multiplexer for generating the synchronizing clock from the output signal of the second multiplexer.

2. The circuit arrangement as claimed in claim 1, characterized in that the clock generator signal is generated by a combination of the received signals of at least two transmission lines of the interfaces, particularly by averaging.

3. The circuit arrangement as claimed in claim 1, characterized in that signals which are transmitted via the transmission lines of the interfaces correspond to an interface protocol of ISDN.

4. The circuit arrangement as claimed in claim 2, characterized in that signals which are transmitted via the transmission lines of the interfaces correspond to an interface protocol of ISDN.

5. The circuit arrangement as claimed in claim 1, characterized in that signals which are transmitted via the transmission lines of the interfaces correspond to an XDSL protocol.

6. The circuit arrangement as claimed in claim 2, characterized in that signals which are transmitted via the transmission lines of the interfaces correspond to an XDSL protocol.

7. The circuit arrangement as claimed in claim 5, characterized in that the XDSL protocol corresponds to an ADSL or SDSL or VDSL or HDSL protocol.

* * * * *